(No Model.)
A. WEISMANTEL.
CAR FENDER.
No. 544,873. Patented Aug. 20, 1895.
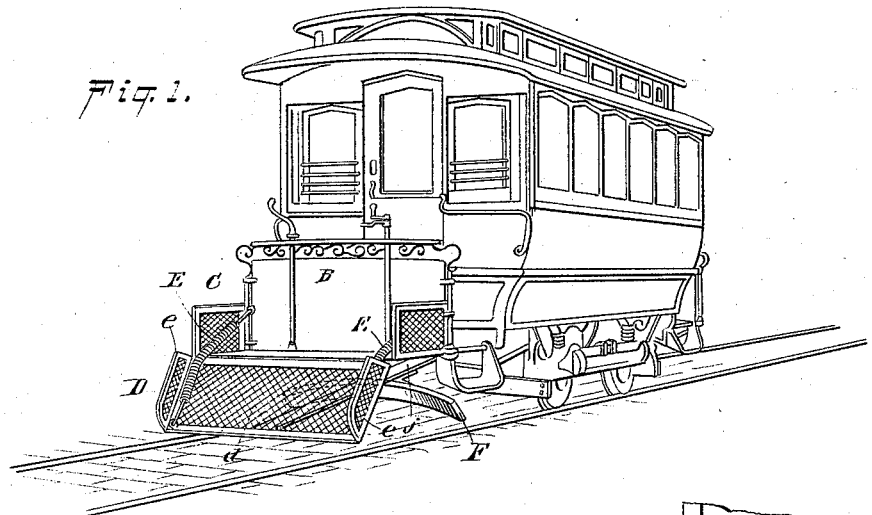
Fig. 1.
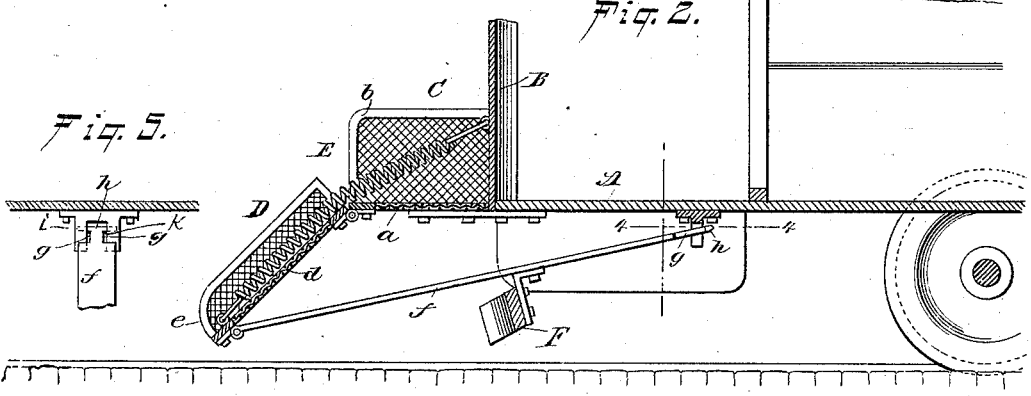
Fig. 2.
Fig. 3.
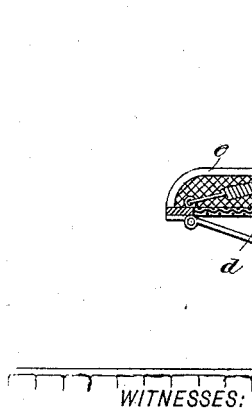
Fig. 5.
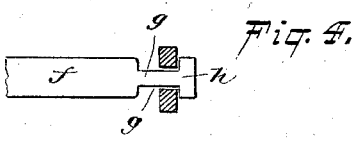
Fig. 4.
WITNESSES:
William P. Goebel
John F. Flagg Jr.
INVENTOR
August Weismantel
BY George Cook
ATTORNEY.

UNITED STATES PATENT OFFICE.

AUGUST WEISMANTEL, OF BROOKLYN, NEW YORK.

CAR-FENDER.

SPECIFICATION forming part of Letters Patent No. 544,873, dated August 20, 1895.

Application filed May 6, 1895. Serial No. 548,204. (No model.)

*To all whom it may concern:*

Be it known that I, AUGUST WEISMANTEL, a citizen of the United States, and a resident of Brooklyn, in the county of Kings and State of New York, have invented certain new and useful Improvements in Car-Fenders, of which the following is a specification.

My invention relates to an improvement in car-fenders, the object of the same being to provide a device of this character which shall be simple and cheap to manufacture, easily and readily attached to the car, and which shall be automatic and certain in its operations.

With these and other ends in view my invention consists in certain novel features of construction and combinations of parts, as will be hereinafter fully described, and pointed out in the claim.

In the accompanying drawings, Figure 1 is a perspective view of a car having my improved fender attached thereto. Fig. 2 is a longitudinal sectional view of the fender. Fig. 3 is a similar view thereof in its raised adjustment. Fig. 4 is a view taken on the line 4 4 of Fig. 2. Fig. 5 is a detailed view.

Referring to the drawings, A represents the platform of a car, and B the dash-board thereof, to which are secured, either permanently or removably, the auxiliary platform C, consisting of the floor or base $a$ and sides $b$, preferably made of woven wire, and adapted to support or assist in supporting a person struck by the fender.

To the front end or edge of the auxiliary platform C is hinged the fender proper D, constructed with a suitable frame and network, preferably metal, forming the base $d$ and sides $e$, said fender being of such size or dimensions that when in its lowered adjustment, as shown in Figs. 1 and 2, it will nearly reach the ground, thereby striking a person about the ankles and causing him to fall or tumble onto said fender and onto the auxiliary platform, the sides $e$ $b$ thereof preventing him from subsequently rolling off.

To the forward under side or edge of the fender-frame is pivoted one end of the rod $f$, the opposite free end of which has the notches or recesses $g$ $g$ cut therein, forming a hook $h$, as shown in Fig. 4.

To the under side of the car-platform is secured the catch $i$, having a recess $k$ formed therein, in which fits the recessed free end of the rod $f$, the hook $h$ on the extreme end of the latter preventing the same from being pulled through the said recess and holding the said rod in position, as hereinafter explained.

To the dashboard of the car is secured one end of the coiled springs E, the opposite ends of which are attached to the frame of the fender proper, the tendency of said springs being to hold the fender in its raised position, as shown in Fig. 3.

To the rod $f$ is secured the guard F, preferably curved in its length, as shown in Fig. 1, and traveling slightly above the ground, the said guard extending across from track to track, and preferably covered with rubber or other material to act as a cushion.

In practice, the fender proper is lowered, as shown in Figs. 1 and 2, the end of the rod $f$ being inserted in the recess of the catch $i$, the tension of the springs pulling the hook $h$ on the end of said rod against the catch $i$ and holding it in that position. If a person be struck by the fender when the latter is in this adjustment, the person will fall thereon, and at the same time the fender by giving slightly will force the rod $f$ backward, the hook $h$ thereby leaving the catch $i$ and allowing the said rod $f$, or at least the free end thereof, to fall by gravity and the fender to be raised by the action of the springs E, as shown in Fig. 3. If by any reason the person should fail to fall upon the fender, the guard F traveling close to the ground will prevent such person from being run over and caught under the wheels.

Having fully described my invention, what I claim as new, and desire to secure by Letters Patent, is—

In a car fender the combination with the platform C, of the fender D hinged to the forward end thereof, springs E connecting said fender with the dash board of the car, rod $f$, secured at one end to the car-fender and provided at its opposite end with the hook $h$, and the catch $i$ secured to the under side of the car platform, and adapted to engage with the free end of said rod $f$, substantially as described.

Signed at New York, in the county of New York and State of New York, this 29th day of April, A. D. 1895.

AUGUST WEISMANTEL.

Witnesses:
JOHN F. FLAGG, Jr.,
F. S. KENNEDY.